(12) United States Patent
Tanner et al.

(10) Patent No.: US 8,852,486 B2
(45) Date of Patent: Oct. 7, 2014

(54) LOW-STRESS MOLDED GASKET AND METHOD OF MAKING SAME

(75) Inventors: T. Scott Tanner, Palmyra, NY (US); Stefan Pitolaj, Walworth, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 1379 days.

(21) Appl. No.: 12/445,404

(22) PCT Filed: Nov. 6, 2007

(86) PCT No.: PCT/US2007/083827
§ 371 (c)(1),
(2), (4) Date: Mar. 8, 2010

(87) PCT Pub. No.: WO2008/058153
PCT Pub. Date: May 15, 2008

(65) Prior Publication Data
US 2010/0155986 A1    Jun. 24, 2010

Related U.S. Application Data

(60) Provisional application No. 60/856,961, filed on Nov. 6, 2006.

(51) Int. Cl.
*B29C 51/08* (2006.01)
*F16J 15/10* (2006.01)

(52) U.S. Cl.
CPC .................................. *F16J 15/106* (2013.01)
USPC ........... 264/322; 264/319; 264/320; 264/321; 264/327; 264/45.1; 264/45.3; 264/45.4; 264/45.6; 264/46.1; 264/46.2; 264/46.8; 264/628; 264/629; 264/630; 264/632; 264/655; 264/663; 264/152; 264/153; 264/241; 264/77

(58) Field of Classification Search
USPC ................ 264/322, 319, 320, 321, 327, 45.1, 264/45.3, 45.4, 45.6, 46.1, 46.2, 46.8, 628, 264/629, 630, 632, 655, 663, 152, 153, 241, 264/77
See application file for complete search history.

(56) References Cited

U.S. PATENT DOCUMENTS 3,076,233 A * 2/1963 Taylor ............................ 264/325
4,388,259 A * 6/1983 Jewell et al. ................... 264/153
(Continued)

FOREIGN PATENT DOCUMENTS

| | | |
|---|---|---|
| EP | 0352403 A2 | 1/1990 |
| EP | 0352608 A2 | 1/1990 |

(Continued)

OTHER PUBLICATIONS

Notification of Transmittal of International Report on Patentability for PCT/US07/83827 mailed Nov. 5, 2009.

(Continued)

*Primary Examiner* — Jeffrey Wollschlager
*Assistant Examiner* — Stella Yi
(74) *Attorney, Agent, or Firm* — Perkins Coie LLP

(57) ABSTRACT

A molded discrete low stress gasket is constructed of restructured filled PTFE for use in corrosive or severe chemical environments under relatively low bolt loads. The gasket has a gasket surface and includes a raised outer sealing ring and a raised inner sealing ring. The gasket may constructed from a restructured filled PTFE material, with the sealing rings deforming at lower pressures than the remaining portions of the gasket.

9 Claims, 7 Drawing Sheets

(56) References Cited

U.S. PATENT DOCUMENTS

| | | | |
|---|---|---|---|
| 4,762,657 A * | 8/1988 | Rogers et al. | 264/83 |
| 4,913,951 A * | 4/1990 | Pitolaj | 428/76 |
| 5,749,586 A | 5/1998 | Abe et al. | |
| 5,971,399 A | 10/1999 | Hashimoto et al. | |
| 6,030,694 A | 2/2000 | Dolan et al. | |
| 6,260,854 B1 | 7/2001 | Lemon | |
| 2004/0175571 A1 | 9/2004 | Buerger et al. | |

FOREIGN PATENT DOCUMENTS

| | | |
|---|---|---|
| JP | 02218784 A2 | 8/1990 |
| JP | 4083977 A | 3/1992 |
| JP | 4331876 A | 11/1992 |
| JP | 5099343 A | 4/1993 |
| JP | 05505666 A | 8/1993 |
| JP | 05301294 A2 | 11/1993 |
| JP | 11016548 A2 | 1/1999 |
| WO | 9925901 | 5/1999 |

OTHER PUBLICATIONS

Japanese Office Action dated Jun. 18, 2013 for Japanese Patent Application No. 2012-119931.

Office Action for European Application No. 07863999.4 dated Feb. 18, 2014; 5 pages.

* cited by examiner

| GASKET TYPE | GSKT STRESS (PSI) | 200 | 300 | 600 | 900 | 1200 | 1800 | 2400 | 3600 | 4040 |
|---|---|---|---|---|---|---|---|---|---|---|
| | INTERNAL PRESS. (PSI) | 50 | | | 580 | | | | | |
| MOLDED GYLON GASKET (GYLON 3504) | LEAKAGE (CC/MIN) | <0.011 | | | <0.011 | | | | | |
| GYLON 3504 (1/2" SHEET) | LEAKAGE (CC/MIN) | EXCESSIVE | | 3.170 | EXCESSIVE | | | 2.845 | 0.511 | 0.249 |
| MOLDED GYLON GASKET (GYLON 3510) | LEAKAGE (CC/MIN) | <0.011 | | | <0.011 | | | | | |
| GYLON 3510 (1/2" SHEET) | LEAKAGE (CC/MIN) | 3.131 | 1.176 | 0.903 | NO TEST | EXCESSIVE | | 0.395 | 0.511 | |

FIG. 6

FRP FLANGE TESTING 6" 150# FF FRP FLANGE MEDIA: H2O

| GASKET TYPE | TORQUE/GASKET STRESS | START PRESSURE (PSIG) | START TIME + 15 MINUTES PRESSURE (PSIG) | START TIME + 60 MINUTES PRESSURE (PSIG) | OBSERVATIONS/NOTES |
|---|---|---|---|---|---|
| GYLON 3504 (1/8" SHEET) | 35 FT-LBS / 455 PSI | 150 | NA | NA | LEAKED DURING PRESSURIZATION-TEST TERMINATED |
| GYLON 3545 (1/8" SHEET) | 35 FT-LBS / 455 PSI | 150 | NA | NA | LEAKED DURING PRESSURIZATION-TEST TERMINATED |
| GYLON 3545 W/PTFE ENVELOPE (SLIT) | 35 FT-LBS / 455 PSI | 150 | NA | NA | LEAKED DURING PRESSURIZATION-TEST TERMINATED |
| COMPETITIVE PRODUCT STYLE 800 | 35 FT-LBS / 455 PSI | 150 | NA | NA | LEAKED DURING PRESSURIZATION-TEST TERMINATED |
| MOLDED GYLON GASKET (GYLON 3504) | 24 FT-LBS / 312 PSI | 150 | 150 | 150 | NO LEAK AT THE FLANGE POINT |

FIG. 7

FRP THERMAL CYCLE TESTING

| GASKET TYPE | FLANGE TYPE | HELIUM LEAK RATE UNDER VACUUM MBAR.L.S-1 | LEAK RATE BY PRESSURE DROP AT 10 BARS | | | | | HELIUM LEAK RATE UNDER VACUUM MBAR.L.S-1 |
|---|---|---|---|---|---|---|---|---|
| | | | 1ST STAGE | | | 5TH STAGE | | |
| | | | ROOM TEMPERATURE MBAR.L.S-1 | TEMPERATURE 80°C MBAR.L.S-1 | TEMPERATURE 80°C MBAR.L.S-1 | ROOM TEMPERATURE MBAR.L.S-1 | | |
| GYLON 3504 (1/16"SHEET) | STEEL LOOSE FLANGE | 7.9E-06 | 3.6E-01 | <5.4E-4 | <5.4E-4 | 1.3E-01 | | 3.1E-03 |
| MOLDED GYLON GASKET (GYLON 3504) | STEEL LOOSE FLANGE | 1.7E-07 | <5.4E-4 | <5.4E-4 | <5.4E-4 | <5.4E-4 | | 9.6E-06 |

FIG.8

LOW-STRESS MOLDED GASKET AND METHOD OF MAKING SAME

FIELD

The present invention relates generally to the field of fluid sealing and gasketed joints and more particularly to low-stress molded gaskets for use in fragile joints, such as plastic (e.g., polyvinyl chloride or "PVC"), fiber reinforced plastic (FRP) and glass lined pipe in which the bolt load is relatively low to prevent damage to the flange joint.

BACKGROUND

A gasket is a material or combination of materials clamped between two separable members or flanges of a mechanical joint. The gasket functions to effect a seal between the flanges and maintain the seal for an extended period of time. FIG. 1 is a cross-sectional view of a gasket 20 clamped between two flanges 24, 28 of a mechanical joint 32. The flanges 24, 28, are secured together with bolt 36. FIG. 1 also illustrates common forces that may affect the joint 32, such as bolt load X, hydrostatic end force Y, and blowout pressure Z. The gasket 20, in many applications, must be capable of sealing the mating surfaces 40, 44, and be impervious and resistant to the sealed media. Such gaskets 20 also must be able to withstand the application of elevated temperature and pressure in many applications. PVC and FRP piping are commonly used in corrosive applications, such as encountered in chemical plants. It will be appreciated that piping systems using these materials are somewhat fragile and require a gasket that will effect a seal at relatively low bolt loads so as not to crack or otherwise damage the flanges. The gasket must also be dimensionally stable so as to maintain a seal during a range of possible thermal changes in the process and have broad chemical compatibility.

Prior attempts to address the problems associated with gaskets for use in fragile joints have included, for example, envelope gaskets, rubber gaskets, rubber/polytetraflouroethylene (PTFE) gaskets, filled PTFE sheet, microcellular/porous PTFE sheet, and composite PTFE sheet. PTFE is commonly employed for gasketing in severe or corrosive chemical environments as it has a number of desirable properties for use as a gasketing material. For example, PTFE is inherently tough, chemically inert, has good tensile strength, and is stable over a broad range of temperatures. However, pure PTFE polymer is not highly compressible under low flange loads, and also is prone to creep, both of which may result in loss of sealing pressure. Envelope gaskets are a composite structure consisting of a PTFE envelope which is filled with a more compressible filler such as compressed fiber or felt. The PTFE envelope provides chemical resistance while deformability is provided by the filler material. However, PTFE envelopes are relatively thin (0.010 to 0.020 inch) and can develop pin holes during manufacture or while in service, thereby exposing the filler to incompatible corrosive media, which may result in loss of sealing pressure. Such envelope gaskets also have the least compressible component, i.e., the PTFE envelope which is not highly compressible or deformable under low flange loads, as outermost gasket surface.

Rubber gaskets are used routinely in plastic and FRP flanges because of their compressibility and resiliency, and their ability to seal at relatively low bolt loads. However, rubber gaskets have limited chemical and temperature resistance, and the proper compound must be specified for each application. Thus, multiple process streams that use the same piping are likely to require a time-consuming and somewhat costly change of gaskets. Rubber/PTFE gaskets incorporate a bonded PTFE envelope at the inner dimension of a rubber gasket. The envelope enhances the chemical resistance while the rubber substrate provides compressibility and deformability. Again however, the PTFE envelopes are thin (0.010 to 0.020 inch) and can develop pin holes during manufacture or while in service, thereby exposing the rubber substrate to incompatible corrosive media. Likewise, the PTFE envelope which is not highly compressible or deformable under low flange loads, is outermost in a rubber/PTFE gasket.

Filled PTFE sheets with good compressibility can be achieved by incorporating microballoons into the PTFE sheet material. Although PTFE sheet material offers the flexibility to be trimmed and modified by an end user, filled PTFE sheet material typically requires relatively high bolt loads to seal. Microcellular/porous PTFE sheets can be produced using a number of techniques, one of which involves adding a filler to the PTFE prior to trimming the sheet and then removing the filler after the sheet is formed. Thus, voids remain in the sheet material which give it a desired porosity (i.e., microcellular PTFE). Another method involves a particular sequence of extruding, stretching, and then heating to form a product known as porous PTFE. However, microcellular and porous PTFE are generally very soft and flexible and can be difficult to install in situations where limited flange separation is possible. Further, because microcellular and porous PTFE sheets are porous, a gasket cut from either must be fully compressed to close off the voids to prevent leakage through the gasket, and gaskets cut from these sheets typically require relatively high bolt loads to seal. In order to address the rigidity issues associated with microcellular/porous PTFE material, it has been proposed to laminate layers of the porous microcellular and/or porous PTFE sheets to a metal or full density PTFE substrate, but testing has shown that these materials likewise require relatively high bolt loads to seal.

SUMMARY

Various aspects of the present disclosure provide a molded discrete low stress gasket constructed of restructured filled PTFE for use in corrosive or severe chemical environments. Embodiments of the invention involve cutting and heating a ring blank of the restructured filled PTFE to its gel point in a hatch oven, and thereafter transferring the blank to a compression mold which is at room temperature and which is configured to mold, for example, two or three raised concentric sealing rings into the opposing faces of the blank. The mold is quickly closed and the article is then cooled under a pressure of approximately 2000 to 3000 pounds per square inch in a hydraulic press. The mold is thereafter opened and the article removed and trimmed using a steel rule die or equivalent cutting device. In the resulting gasket, areas adjacent the rings are compressed to a greater extent during the molding process, resulting in higher densification of the filled PTFE. These regions impart strength and rigidity to the gasket, while the regions of the sealing rings are left substantially intact, yielding a region of high compressibility.

Additional advantages and novel features of the invention will be set forth in part in the description which follows, and in part will become apparent to those skilled in the art upon examination of the following.

BRIEF DESCRIPTION OF THE DRAWINGS

FIG. 6 illustrates examples of comparative test results including a gasket of an embodiment of the present disclosure and various other types of gasket materials;

FIG. 7 illustrates examples of additional comparative test results of gaskets according to embodiments of the present disclosure over various other types of gasket materials; and FIG. 8 illustrates examples of further comparative test results of gaskets according to embodiments of the present disclosure over various other types of gasket materials.

DETAILED DESCRIPTION

Figure 1:
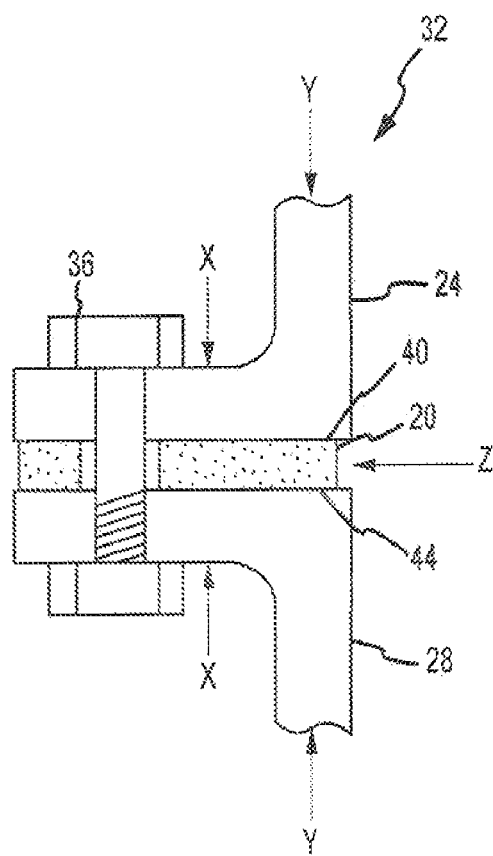
FIG. 1 is a cross-sectional view of a gasket clamped between two flanges of a mechanical joint which illustrates forces affecting the joint, such as bolt load, hydrostatic end force, and blowout pressure.

The inventors of the present invention have recognized several shortcomings of prior gasket materials, and have developed a gasket described herein that has several features and advantages. For example, it is a feature and advantage of the present disclosure to provide a molded discrete low stress gasket constructed of restructured filled PTFE for use in corrosive or severe chemical environments. Another exemplary feature and advantage of the present disclosure to provide a molded low stress gasket for use in corrosive or severe chemical environments that effects a seal at low loads thereby reducing possible damage to fragile flanges that may result from relative high bolt loads that are required to effect a seal on traditional gaskets. A further exemplary feature and advantage of the present disclosure is to provide a molded low stress gasket for use in corrosive or severe chemical environments that has good recovery and maintains a seal when thermal cycled. An additional exemplary feature and advantage of the present disclosure is to provide a molded low-stress gasket that is highly compressible and deformable to allow it to conform to distortions and undulations of mating flanges. Yet another exemplary feature and advantage of the present disclosure is to provide a molded low-stress gasket that is rigid to facilitate installation. A still further exemplary feature and advantage of the present disclosure is to provide a molded low-stress gasket that does not adhere to the joint flanges thereby simplifying replacement. Another exemplary feature and advantage of the present disclosure is to provide a molded low-stress gasket that has a broad range of chemical and temperature resistance.

Reference is now made in detail to various exemplary embodiments of the invention, one or more examples of which are illustrated in the accompanying drawings. Each example is provided by way of explanation, and is not to be considered as a limitation of the invention. It will be apparent to those skilled in the art that various modifications and variations can be made in various of the disclosed embodiments without departing from the scope or spirit of the invention. For example, features illustrated or described as part of one embodiment can be used on another embodiment to yield a still further embodiment. Thus, it is intended that the present disclosure cover such modifications and variations that come within the scope of the invention.

Embodiments of the present disclosure provide a molded PTFE gasket in which the base material is PTFE that is enhanced both by processing and through the incorporation of fillers to create a material that is compressible and less prone to creep than pure PTFE. Further, various exemplary embodiments involve incorporation of raised concentric sealing rings which are molded into the two opposing faces of the gasket. Such raised concentric sealing rings act to reduce the contact area of the gasket and result in increased sealing stress under the sealing rings at reduced bolt loads.

A gasket according to embodiments of the invention may have two to three concentric sealing rings molded into its outer surfaces and having a raised surface relative to other surfaces of the gasket, which reduce the contact area of the gasket on the flange. It is noted that other embodiments may likewise have only one sealing ring or three or more sealing rings. The resulting flange load created by tightening the flange bolts is thus distributed over a relatively small surface area resulting in relatively high stress in the regions of the sealing rings. The sealing rings thus enable the gasket to effect a seal at reduced bolt loading.

Figure 2:
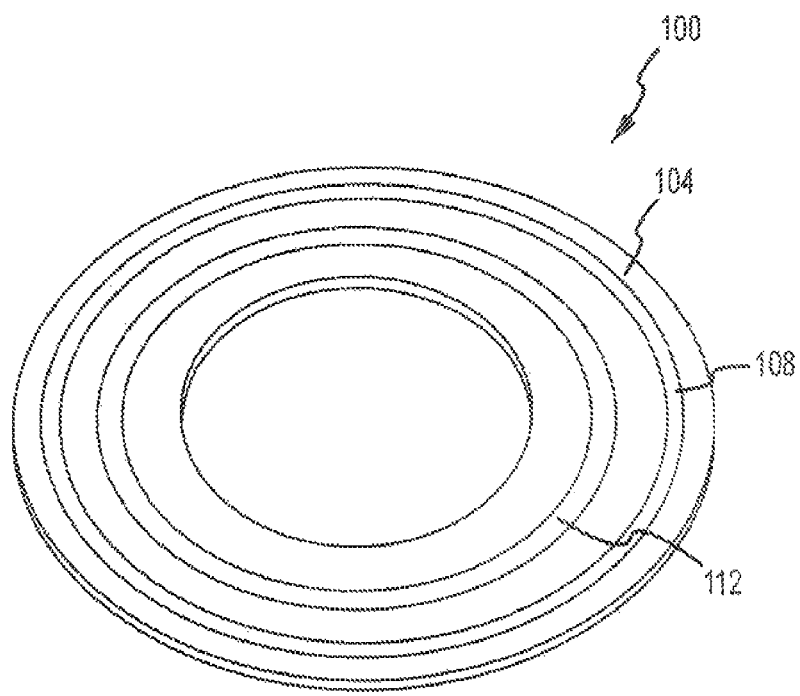
FIG. 2 is a perspective view of a low-stress molded gasket having two concentric sealing rings for an exemplary embodiment.
Figure 3:
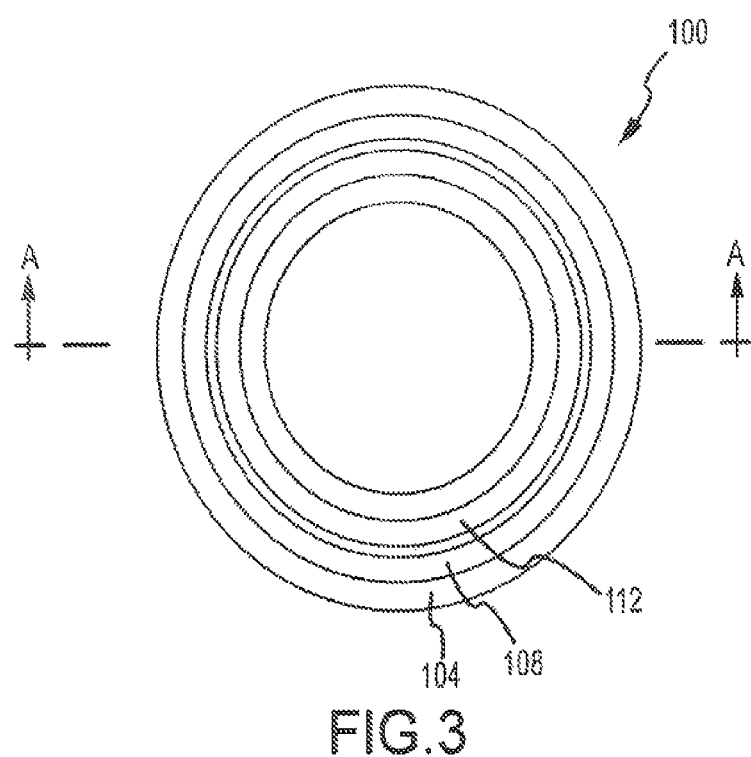
FIG. 3 is a top plan view of a low-stress molded gasket having two concentric sealing rings for an exemplary embodiment.

With reference now to FIGS. 2-5, an embodiment is described in which a low-stress molded gasket has two concentric sealing rings. FIG. 2 illustrates a perspective view, and FIG. 3 illustrates a top plan view, of the gasket 100, that has a gasket surface 104 and includes an outer sealing ring 108, and an inner sealing ring 112. The outer sealing ring 108 and inner sealing ring 112 each have a surface that is raised relative to the gasket surface 104, and are also formed of material that is more easily deformed than the material associated with the gasket surface 104. The portions of the gasket associated with the gasket surface 104 are referred to as ribs. The gasket 100 of this embodiment, and various other embodiments, is constructed from a restructured filled PTFE material that is commercially available from Garlock Sealing Technologies, Palymra, N.Y., under the trademark GYLON®. The restructured filled PTFE of this embodiment includes polymeric chains have a biaxial orientation, to provide improved mechanical properties and reduced creep, as compared to conventional PTFE compounds. The filler in one embodiment is a microballoon which enhances compressibility to provide a tight seal when subjected to minimal pressure, such as reduced bolt loads in a fragile joint. The PTFE matrix which encapsulates the filler provides the chemically inert structure of the gasket 100. In such a manner, the gasket 100 has regions of relatively deformable material in sealing rings 108, 112, and has rib regions of relatively rigid material 104.

Figure 4:
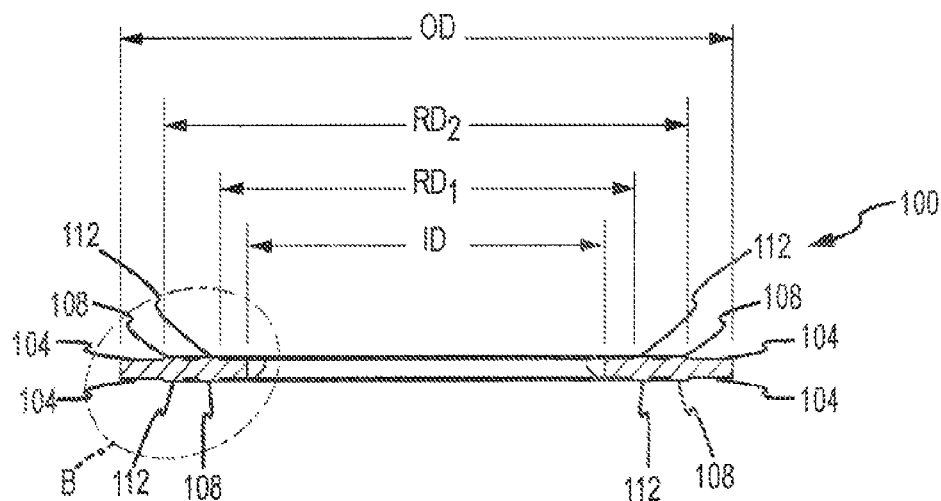
FIG. 4 is a cross-sectional view along section line A-A of FIG. 3.
Figure 5:
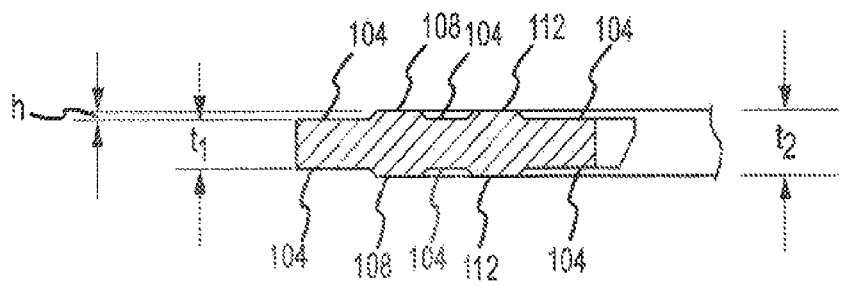
FIG. 5 is an enlarged view of section B of FIG. 4.

FIG. 4 illustrates a cross-sectional view along section lines A-A of FIG. 3, and FIG. 5 is a magnified view of section B of FIG. 4. In this example, the gasket 100 has a circular configuration, with sealing rings 108, 112, forming concentric rings within the gasket 100. The gasket 100 has an outer diameter OD, and an inner diameter ID. Sealing ring 108 has a ring diameter $RD_1$ and sealing ring 112 has a ring diameter $RD_2$. The sealing rings 108 and 112, in this embodiment, are raised and have a height h relative to surface 104, with the gasket having a thickness $t_1$ relative to areas 104, and a thickness $t_2$ relative to the areas of the sealing rings 108 and 112. While a circular gasket 100 is illustrated, it will be readily understood that a gasket may be made in accordance with the present disclosure in any of numerous different configurations.

A gasket is formed, in various embodiments, according to several processing steps. A gasket of one embodiment is formed from a sheet of restructured filled PTFE of proper thickness, that is formed from known processing techniques. The sheet of restructured filled PTFE is dried for six hours at 225° F. to remove solvent that may be remaining in the formed sheet. A ring blank of inner and outer dimensions (ID and OD) is cut using a steel rule die, or equivalent cutting device. The blank is heated to its gel point of approximately 700° F. for fifteen minutes in a ventilated batch oven. Thereafter, the blank is rapidly transferred from the batch oven to a compression mold which is at room temperature. The compression mold is configured to mold raised concentric sealing rings 108 and 112 into the opposing faces of the gasket. The mold is quickly closed and the article is then cooled under a pressure of approximately 2000 to 3000 pounds per square inch in a hydraulic press for approximately one minute. The mold is thereafter opened and the gasket removed and finally trimmed using a steel rule die or equivalent cutting device.

The foregoing process, known as coining, together with the raised concentric sealing ring geometry creates regions of differing compressibility/density within the gasket 100. Areas adjacent the rings 108 and 112 are compressed to a greater extent during the coining process resulting in higher densification of the filled PTFE. These regions impart strength and rigidity to the portions of gasket 100 that correspond to gasket surface 104, also referred to as ribs. In the regions of the sealing rings 108 and 112, a reduced level of densification occurs to form the ring features, yielding regions of high compressibility. It should he noted that the compressibility of the ribs may be selected to support and transmit the bolt load to the opposing flange faces without excessive deformation, for various applications.

In alternate embodiments, other suitable fillers, such as barium sulphate, silica, graphite, as well as microballoons, can be used to provide desired mechanical properties and/or chemical resistance of the PTFE for various applications. Other embodiments may include metal or other material that is incorporated into the gasket. For example, two rings of perforated stainless steel sheet approx. 0.008" thick may be encapsulated at an inner perimeter and an outer perimeter of the gasket. These rings can serve dual purposes of increasing the tensile strength of the gasket to give it higher pressure capability and also acting as a heating element for in-mold sintering using an induction heating device.

FIG. 6 is a table illustrating examples of comparative test of gaskets according to embodiments of the present disclosure and various other types of gasket materials. The tests of FIG. 6 were performed based on the DIN 3535 standard at low load and ambient temperature in which leakage of gas through the seal under various gasket stresses and internal pressures was collected and measured using a manometer. Referring further to FIG. 6, the gasket materials tested included the molded restructured microballoon filled PTFE gasket for various embodiments of the present disclosure [Molded Gylon Gasket (Gylon 3504)]; a finished flat sheet of restructured microballoon filled PTFE [Gylon 3504 (⅛" Sheet)]; a molded restructured barium sulphate filled PTFE gasket for further alternate embodiments of the present disclosure [Molded Gylon Gasket (Gylon 3510)]; and a finished flat sheet of restructured barium sulphate filled PTFE gasket [Gylon 3510 (⅛" Sheet)].

FIG. 7 is a table of additional comparative test results of gaskets according to embodiments of the present disclosure over various other types of gasket materials. Referring to FIG. 7, FRP flange testing was performed with a six inch 150 pound, full face FRP flange using water as a medium on gasket materials including a finished flat sheet of restructured microballoon filled PTFE [Gylon 3504 (⅛" Sheet)]; a finished flat sheet with porous PTFE outer layers and full density PTFE inner layer [Gylon 3545 (⅛" Sheet)]; a finished flat sheet with porous PTFE outer layers and full density PTFE inner layer with an unfilled PTFE envelope [Gylon 3545 w/PTFE Envelope]; an expanded PTFE gasket [Competitive Product Style 800]; and the molded restructured microballoon filled PTFE gasket for embodiments of the present disclosure [Molded Gylon Gasket (Gylon 3504)].

FIG. 8 is a table of additional comparative test results of gaskets according to embodiments of the present disclosure over various other types of gasket materials. Referring to FIG. 8, thermocycling tests were performed on gasket materials including a finished flat sheet of restructured microballoon filled PTFE [Gylon 3504 (118" Sheet)]; and the molded restructured microballoon filled PTFE gasket for embodiments of the present disclosure [Molded Gylon Gasket (Gylon 3504)].

It should be recognized that the various exemplary embodiments described herein are merely illustrative of the principles of the present invention. Numerous modifications and adaptations thereof will be readily apparent to those skilled in the art without departing from the spirit and scope of the present invention.

The invention claimed is:

1. A method of making a gasket, the method comprising the steps of:
    providing a sheet of restructured filled PTFE;
    cutting a ring blank from the sheet of restructured filled PTFE;
    heating the ring blank to a gel point for the restructured filled PTFE;
    inserting the ring blank into a compression mold, which is at room temperature when the ring blank is inserted, and shaped to mold at least two concentric, raised sealing rings into each of a pair of opposing faces of the ring blank; the mold being further shaped to space the concentric rings apart from one another, separated by compressed regions;
    cooling the ring blank within the compression mold under pressure, at room temperature, until the ring blank forms a gasket defined by at least two concentric, raised sealing rings that are less dense and more compressible than the compressed regions that separate the rings; and
    removing the gasket from the compression mold.

2. The method of claim 1 further comprising:
    drying the sheet of restructured filled PTFE to substantially remove any solvent that may be within the sheet of restructured filled PTFE.

3. The method of claim 2 wherein the sheet of restructured filled PTFE is dried at an approximate temperature of 225° F.

4. The method of claim 1 wherein the ring blank is heated to a temperature of approximately 700° F.

5. The method of claim 4 wherein the ring blank is heated for approximately fifteen minutes.

6. The method of claim 1 wherein the ring blank is cooled within the compression mold under a pressure of approximately 2000 to 3000 pounds per square inch.

7. The method of claim 6 wherein the ring blank is cooled within the compression mold under pressure for a period of approximately one minute.

8. The method of claim 1 wherein the restructured filled PTFE of the sheet of restructured filled PTFE is filled with microballoons.

9. A method of making a gasket, the method comprising the steps of:
    cutting a ring blank from a sheet of restructured filled PTFE;
    heating the ring blank to a gel point for the restructured filled PTFE;
    inserting the ring blank into a compression mold, which is at room temperature when the ring blank is inserted, and shaped to mold at least one raised sealing ring into each of a pair of opposing faces of the ring blank; the mold being further shaped to form concentric compressed regions on opposite sides of the at least one raised sealing ring;

cooling the ring blank within the compression mold, under pressure, at room temperature, for approximately one minute until the ring blank forms a gasket defined by at least two concentric, compressed regions that are more dense and less compressible than the at least one raised sealing ring that separate the compressed regions.

* * * * *